United States Patent
Cui et al.

(10) Patent No.: US 9,948,360 B2
(45) Date of Patent: Apr. 17, 2018

(54) BASE STATION, WIRELESS COMMUNICATION TERMINAL, WIRELESS COMMUNICATION SYSTEM AND WIRELESS COMMUNICATION METHOD

(71) Applicant: SONY CORPORATION, Tokyo (JP)

(72) Inventors: Qimei Cui, Beijing (CN); Hui Wang, Beijing (CN)

(73) Assignee: SONY CORPORATION, Tokyo (JP)

( * ) Notice: Subject to any disclaimer, the term of this patent is extended or adjusted under 35 U.S.C. 154(b) by 160 days.

(21) Appl. No.: 14/431,356

(22) PCT Filed: Jul. 8, 2013

(86) PCT No.: PCT/CN2013/078987
§ 371 (c)(1),
(2) Date: Mar. 26, 2015

(87) PCT Pub. No.: WO2014/048158
PCT Pub. Date: Apr. 3, 2014

(65) Prior Publication Data
US 2015/0295624 A1 Oct. 15, 2015

(30) Foreign Application Priority Data
Sep. 29, 2012 (CN) .......................... 2012 1 0376901

(51) Int. Cl.
*H04W 4/00* (2009.01)
*H04L 1/00* (2006.01)
(Continued)

(52) U.S. Cl.
CPC ........... *H04B 7/024* (2013.01); *H04B 7/0626* (2013.01); *H04L 1/0026* (2013.01); *H04L 1/0027* (2013.01)

(58) Field of Classification Search
CPC ........... H04B 7/24; H04B 7/0626; H04L 1/00; H04L 1/0026; H04L 1/0027; H04L 1/16
See application file for complete search history.

(56) References Cited

U.S. PATENT DOCUMENTS

| | | | |
|---|---|---|---|
| 2011/0237272 A1* | 9/2011 | Gorokhov | H04B 7/024 455/452.1 |
| 2011/0237282 A1 | 9/2011 | Geirhofer et al. | |

(Continued)

FOREIGN PATENT DOCUMENTS

| | | |
|---|---|---|
| CN | 102056264 | 5/2011 |
| CN | 102687551 | 9/2012 |
| WO | 2010 145596 | 12/2010 |

OTHER PUBLICATIONS

International Search Report dated Oct. 17, 2013 in PCT/CN13/078987 filed Jul. 8, 2013.

*Primary Examiner* — Lonnie Sweet
(74) *Attorney, Agent, or Firm* — Oblon, McClelland, Maier & Neustadt, L.L.P.

(57) ABSTRACT

Disclosed are a base station, a wireless communication terminal, a wireless communication system, and a wireless communication method. The base station can be used in coordinated multi-point transmission and comprises: a channel quality obtaining unit for obtaining uplink channel quality between a user equipment and a coordinated base station; a channel quality determination unit for comparing the obtained uplink channel quality with a quality threshold to determine whether the uplink channel quality is good or bad; a feedback control unit for determining, according to a determination result, whether to allow the user equipment to feed back channel state information to the corresponding coordinated base station; and a sending unit for sending information, about how to feed back the channel status information, to the user equipment. When the determination (Continued)

result is that the uplink channel quality is better than channel quality represented by the quality threshold, the feedback control unit determines to allow the user equipment to feed back the channel status information to the corresponding coordinated base station; when the determination result is that the uplink channel quality is poorer than the channel quality represented by the quality threshold, the feedback control unit determines not to allow the user equipment to feed back the channel status information to the corresponding coordinated base station.

17 Claims, 9 Drawing Sheets

(51) Int. Cl.
      *H04B 7/06*           (2006.01)
      *H04B 7/024*         (2017.01)

(56) References Cited

U.S. PATENT DOCUMENTS

| | | | | |
|---|---|---|---|---|
| 2011/0244847 A1* | 10/2011 | Mallik | .................. | H04B 7/024 455/422.1 |
| 2012/0009959 A1* | 1/2012 | Yamada | ............... | H04B 7/0413 455/507 |
| 2012/0207047 A1* | 8/2012 | Liao | ..................... | H04L 1/0026 370/252 |
| 2012/0243486 A1* | 9/2012 | Zeira | .................. | H04W 72/005 370/329 |

\* cited by examiner

BASE STATION, WIRELESS COMMUNICATION TERMINAL, WIRELESS COMMUNICATION SYSTEM AND WIRELESS COMMUNICATION METHOD

TECHNICAL FIELD

The present invention relates to the field of wireless communication, and especially relates to a base station, a wireless communication terminal, a wireless communication system and a wireless communication method.

BACKGROUND ART

Recently, people are discussing the introduction of the fourth generation cellular system (4G) to achieve an improvement on additional performance of wireless communication. Techniques such as coordinated multiple point (CoMP) transmission in 4G are gaining more attentions.

The coordinated multiple points transmission is a technique such that multiple base stations coordinates with each other to perform data communication with a communication terminal. More specifically, the coordinated multiple points transmission refers to a technique where multiple base station perform data communication with one communication terminal simultaneously. The technique can expand the coverage of high data rate communication, and effectively solve the problem of interference between cells caused by orthogonal frequency division multiplexing (OFDM).

In a wireless communication system of performing coordinated multiple points transmission, the wireless communication terminal acting as a user equipment is required to feed back to the coordinated base stations various information and parameters which can reflect the state of downlink channels and can help the base stations to determine the design of transmission schemes (a set of points involved in the coordinated multiple points transmission, the transmission scheme for the coordinated multiple point, modulation and coding scheme, and etc.). Such information and parameters will be collectively called as channel state information in the following. Currently, there are two schemes for feeding back multiple channel state information for the coordinated multiple points transmission. One is the mode where multiple channel state information are fed back via time division multiplexing (TDM). Another is the mode where multiple channel state information are fed back via other non-time division multiplexing such as frequency division multiplexing (FDM) or code division multiplex (CDM).

In the time division multiplexing scheme, multiple channel state information are transmitted over the same physical uplink control channel (PUCCH) or physical uplink shared channel (PUSCH) and reach the base station sides at different times. In the non-time division multiplexing scheme, multiple channel state information are transmitted by using the multiplexing mode such as Frequency Division Multiplexing or Code Division Multiplex and reach the base station sides at the same time.

SUMMARY OF THE INVENTION

Technical Problem

The scheme of feeding back channel state information in a time division multiplexing mode is similar to the feedback scheme of multiple channel state information in the carrier aggregation (CA), and introduces no significant change to the original standard. However, because the channel state information reach the base station sides at different times, the scheme may cause the problem of schedule latency, affecting the performance of multiple point coordinated transmission.

The scheme of feeding back the channel state information in a non-time division multiplexing mode allows multiple channel state information reach the base station sides at the same time, thereby avoiding the problem of schedule latency. However, as the number of channel state information to be fed back increases, the coverage of PUCCH or PUSCH reduces. The larger the number of channel state information to be fed back is, the severer the influence on the coverage of PUCCH or PUSCH will be.

In summary, feeding back multiple channel state information relates to two key factors: schedule latency and PUCCH or PUSCH coverage. The above two schemes have respective advantages and drawbacks in view of these two factors, and there has been no satisfying trade-off between them.

In addition, currently, there is no consideration of the uplink channel quality in determining a base station which the channel state information has to be fed back to. In fact, a worse uplink channel quality may severely affect the demodulation performance of PUCCH or PUSCH.

The present invention is made in view of the above problems. An object of the present invention is to provide a new and improved base station, wireless communication terminal, wireless communication system and wireless communication method, which can determine base stations which the channel state information have to be fed back to by considering the uplink channel quality, and can determine the specific mode used for the feedback by considering the number of state information to be fed back and the uplink channel quality.

Solutions to the Problems

The following idea is used to solve the above problems. Firstly, it is possible to feed back the channel state information only to the base stations having good uplink channel qualities. Secondly, after determining the base stations which will receive the feedback, it is possible to use only the feedback scheme via non-time division multiplexing if the number of the channel state information to be fed back is small, and to use the feedback scheme via non-time division multiplexing if the number of the channel state information to be fed back is large. The coverage of PUCCH or PUSCH may be severely reduced. In this case, it is possible to use the feedback scheme combining the two multiplexing; in addition, it is also possible to determine the specific multiplexing feedback mode of the channel state information according to the uplink channel quality, and assign a higher multiplexing feedback priority to the channel state information which is more correlated with the uplink channel having a better channel quality.

Specifically, according to one aspect of the present invention, there is provided a base station which can be used for coordinated multiple points transmission, comprising: a channel quality acquisition unit adapted to acquire uplink channel qualities of uplink channels between a user equipment and coordinated base stations; A channel quality judgment unit adapted to judge whether the uplink channel qualities are good or bad by comparing the acquired uplink channel qualities with a first quality threshold; A feedback control unit adapted to determine whether the user equipment is allowed to feed back channel state information to corresponding coordinated base stations based on the judgment result; and a transmitting unit adapted to transmit information indicating how to feed back the channel state information to the user equipment. The feedback control unit determines that the user equipment is allowed to feed back the channel state information to the corresponding coordinated base stations when the judgment result indicates that the uplink channel qualities are better than a channel quality represented by the first quality threshold; And the feedback control unit determines that the user equipment is not allowed to feed back the channel state information to the corresponding coordinated base stations when the judgment result indicates that the uplink channel qualities are worse than the channel quality represented by the first quality threshold.

Further, according to one aspect of the present invention, there is provided a wireless communication system comprising the base station which can be used for coordinated multiple points transmission as described in the above aspect.

Further, according to one aspect of the present invention, there is provided a wireless communication method for coordinated multiple points transmission, comprising: a channel quality acquisition step of acquiring uplink channel qualities of uplink channels between a user equipment and coordinated base stations; A channel quality judgment step of judging whether the uplink channel qualities are good or bad by comparing the acquired uplink channel qualities with a first quality threshold; A feedback control step of determining whether the user equipment is allowed to feed back channel state information to corresponding coordinated base stations based on the judgment result; and a transmitting step of transmitting information indicating how to feed back the channel state information to the user equipment. In the feedback control step, it is determined that the user equipment is allowed to feed back the channel state information to the corresponding coordinated base stations when the judgment result indicates that the uplink channel qualities are better than a channel quality represented by the first quality threshold; And it is determined that the user equipment is not allowed to feed back the channel state information to the corresponding coordinated base stations when the judgment result indicates that the uplink channel qualities are worse than the channel quality represented by the first quality threshold.

Further, according to one aspect of the present invention, there is provided a base station which can be used for coordinated multiple points transmission, comprising: a channel quality acquisition unit adapted to acquire uplink channel qualities of uplink channels between a user equipment and coordinated base stations; A priority setting unit adapted to set a priority for the channel state information according to the definition on the channel state information and the uplink channel quality of the uplink channel between the user equipment and each coordinated base station; and a feedback mode determination unit adapted to determine the feedback multiplexing mode of the channel state information according to the set priority when the channel state information is to be fed back by the user equipment in a feedback mode combining time division multiplexing and non-time division multiplexing; and a transmitting unit adapted to transmit information indicating the determined feedback multiplexing mode to the user equipment. The priority setting unit sets the priority by setting a higher priority for the channel state information which is more correlated with the uplink channel having a better channel quality; and wherein the feedback mode determination unit determines the feedback multiplexing mode so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

Further, according to one aspect of the present invention, there is provided a wireless communication system comprising the base station which can be used for coordinated multiple points transmission as described in the immediately above aspect.

Further, according to one aspect of the present invention, there is provided a wireless communication method for coordinated multiple points transmission, comprising: a channel quality acquisition step of acquiring uplink channel qualities of uplink channels between a user equipment and coordinated base stations; A priority setting step of setting a priority for the channel state information according to the definition on the channel state information and the uplink channel quality of the uplink channel between the user equipment and each coordinated base station; and a feedback mode determination step of determining the feedback multiplexing mode of the channel state information according to the set priority when the channel state information is to be fed back by the user equipment in a feedback mode combining time division multiplexing and non-time division multiplexing; and a transmitting step of transmitting information indicating the determined feedback multiplexing mode to the user equipment. In the priority setting step, the priority is set by setting a higher priority for the channel state information which is more correlated with the uplink channel having a better channel quality; and wherein in the feedback mode determination step, the feedback multiplexing mode is determined so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

Further, according to one aspect of the present invention, there is provided a wireless communication terminal which can be used for coordinated multiple points transmission, comprising: a channel quality acquisition unit adapted to acquire the uplink channel quality of an uplink channel between the user equipment and each coordinated base station; A priority setting unit adapted to set a priority for the channel state information according to the definition on the channel state information and the uplink channel quality of the uplink channel between the wireless communication terminal and each coordinated base station; and a feedback mode determination unit adapted to determine the feedback multiplexing mode of the channel state information according to the set priority when the channel state information is to be fed back by the wireless communication terminal in a feedback mode combining time division multiplexing and non-time division multiplexing; and a feedback unit adapted to feed back the channel state information according to the determination result of the feedback mode determination unit. The priority setting unit sets the priority by setting a higher priority for the channel state information which is more correlated with the uplink channel having a better channel quality; and wherein the feedback mode determination unit determines the feedback multiplexing mode so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

Further, according to one aspect of the present invention, there is provided a wireless communication terminal which can be used for coordinated multiple points transmission, comprising: a channel state information number determination unit adapted to determine the number of the channel state information to be fed back based on a definition on the channel state information; A feedback mode determination unit adapted to determine a feedback mode of the channel state information based on the determined number of the channel state information to be fed back; and a feedback unit adapted to feed back the channel state information according to the determination result of the feedback mode determination unit, wherein, the feedback mode determination unit determines a feedback mode combining time division multiplexing and non-time division multiplexing as the feedback mode of the channel state information when the number of the channel state information to be fed back is larger than a predetermined threshold; And the feedback mode determination unit determines a feedback mode using a single one of time division multiplexing and non-time division multiplexing as the feedback mode of the channel state information when the number of the channel state information to be fed back is less than or equal to the predetermined threshold.

Advantageous Effects of the Invention

As stated above, by using the present invention, it is possible to determine base stations which the channel state information have to be fed back to by considering the uplink channel quality, and determine the specific mode used for the feedback by considering the number of state information to be fed back and the uplink channel quality. Therefore, in one aspect, the overhead of unnecessary feedback is reduced. In another aspect, a satisfying trade-off can be achieved between the schedule latency and PUCCH or PUSCH coverage of a multiple point coordinated transmission system.

Figure 5:
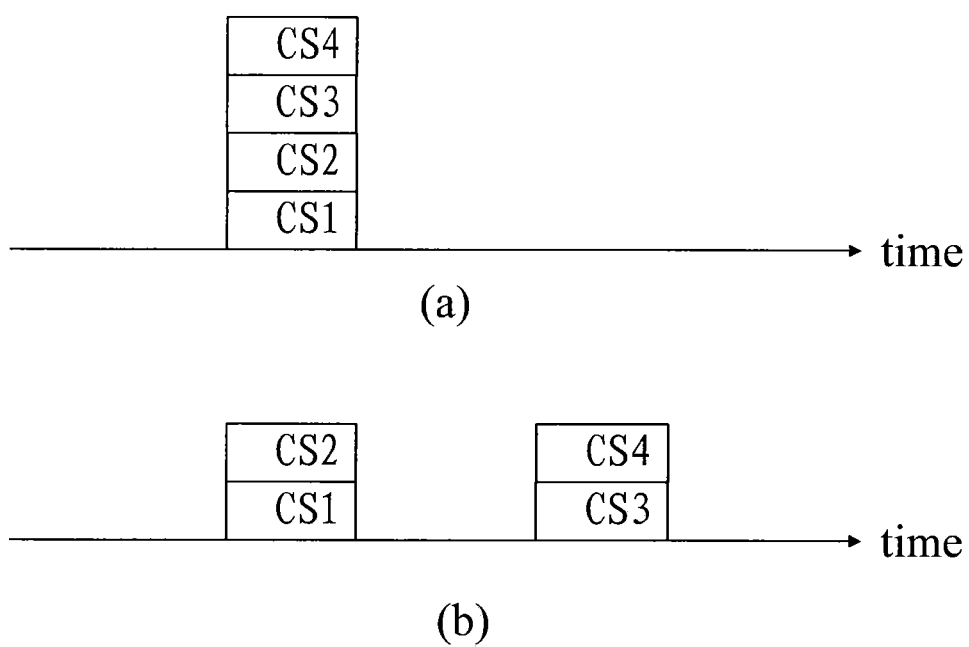

Parts (a) and (b) of FIG. 5 are respective schematic views for respectively illustrating feedback modes for performing non-time division multiplexing and multiplexing combining time division multiplexing and non-time division multiplexing of the channel state information.

Figure 6:
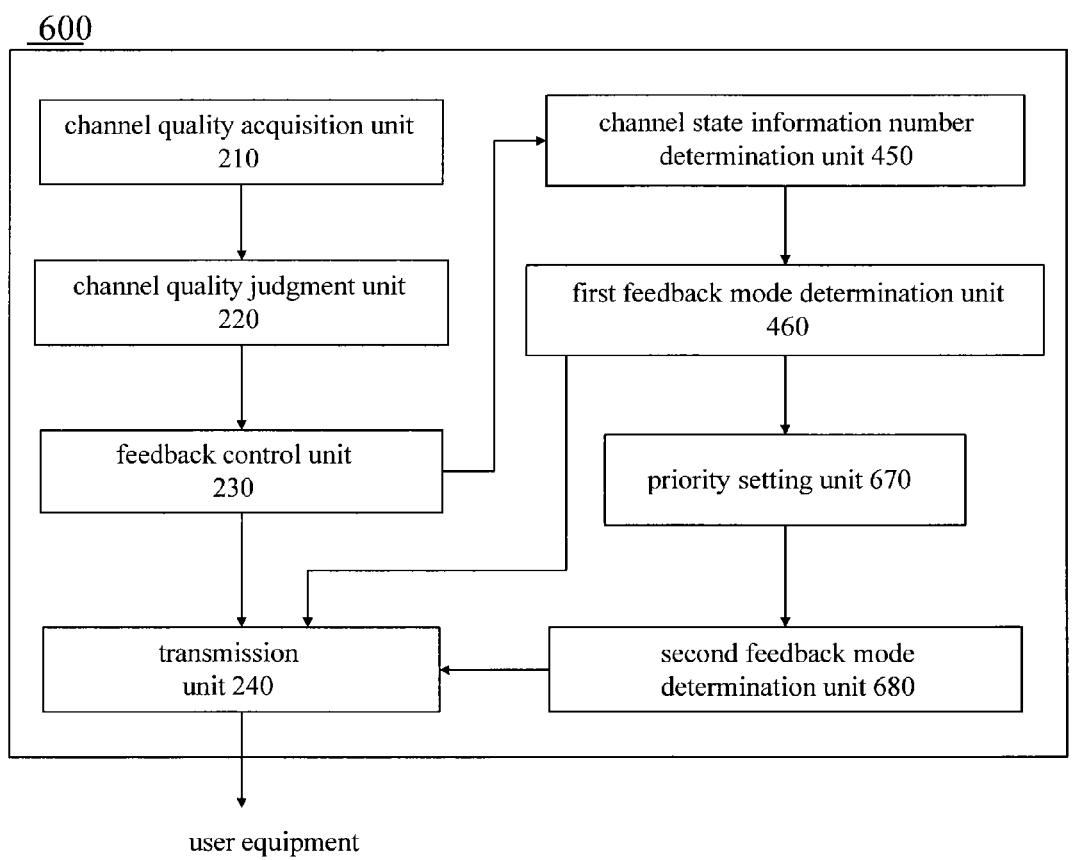

FIG. 6 is a block diagram for illustrating the functional structure of a base station according to another embodiment of the present invention.

Figure 7:
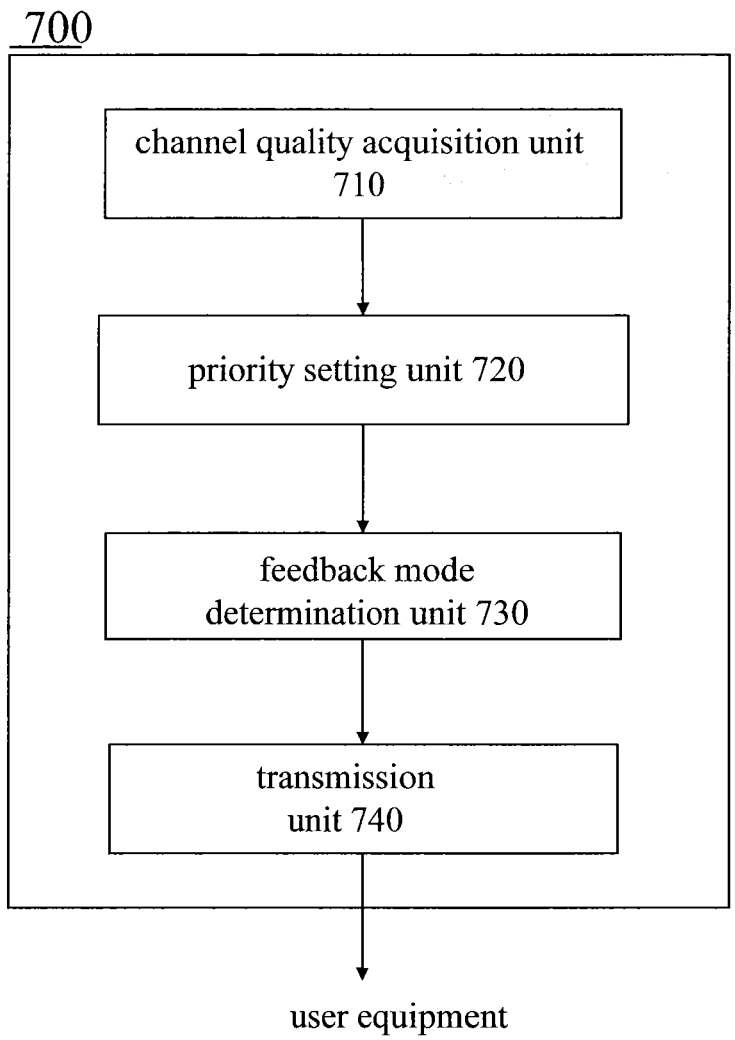

FIG. 7 is a block diagram for illustrating the functional structure of a base station according to an embodiment of the present invention.

Figure 8:
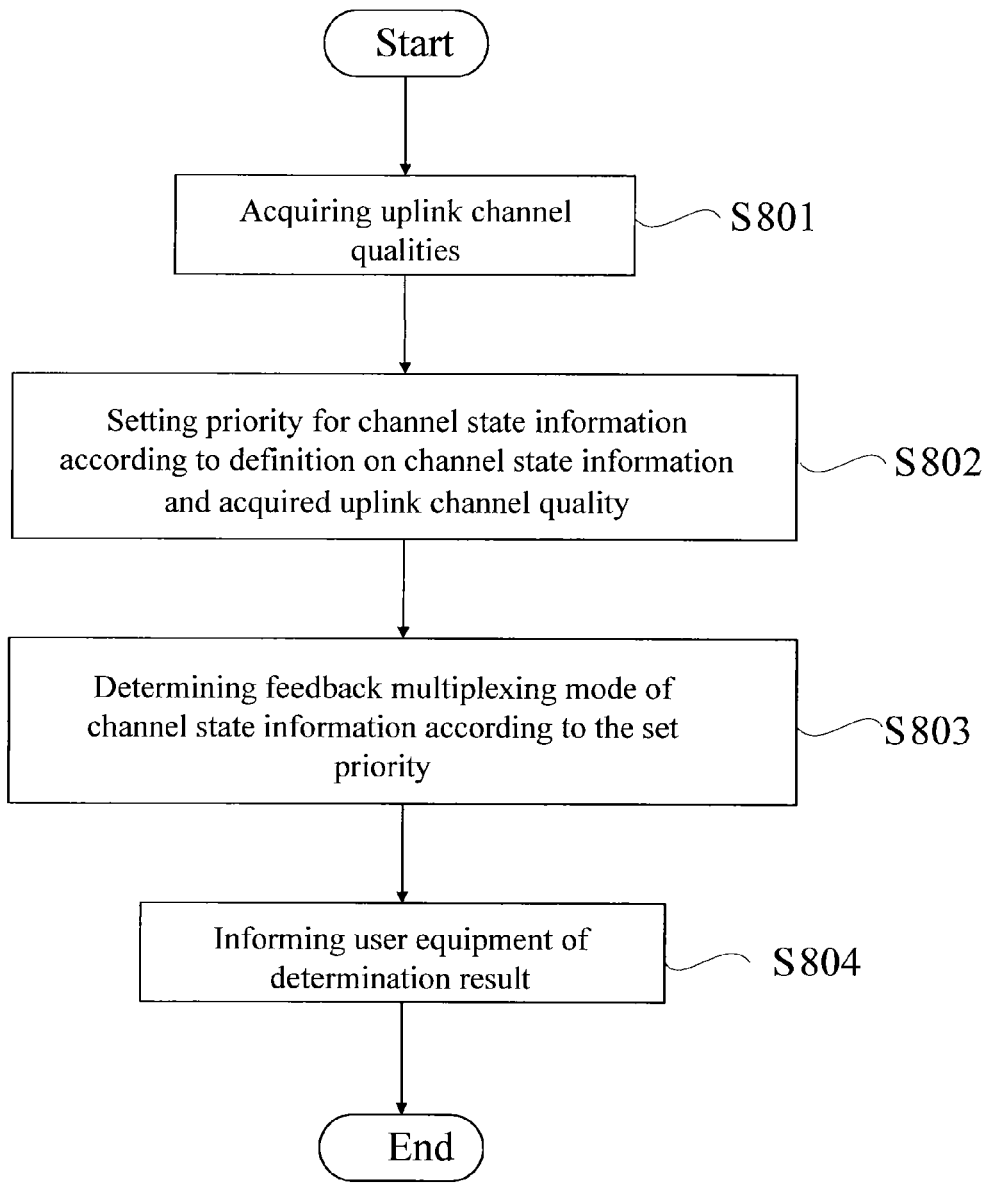

FIG. 8 is a flow chart for illustrating a method of determined the feedback multiplexing mode of channel state information according to an embodiment of the present invention.

Figure 9:
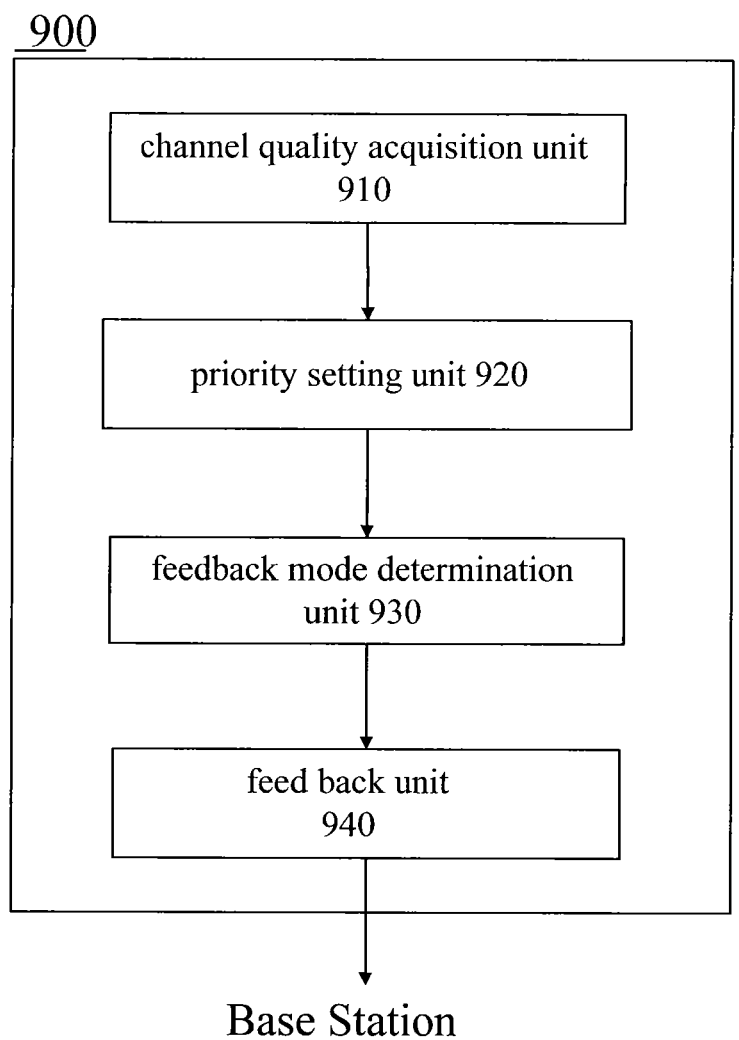

FIG. 9 is a block diagram for schematically illustrating the functional structure of a communication terminal according to an embodiment of the present invention.

DETAILED DESCRIPTION OF THE EMBODIMENTS

Preferable embodiments of the present invention will be described in detail with reference to the accompanying drawings in the following. It should be noted that the same reference signs are used to represent elements with substantially the same functions and structures in the specification and the accompanying drawings, and their duplicate description will be omitted.

Further, in the specification and accompanying drawings, multiple elements with substantially the same functions and structures may be discriminated from each other with the same reference signs followed by different letter suffixes. For example, if desired, multiple elements with substantially the same functions and structures are discriminated from each other, such as base stations 10A, 10B, 10C and 10D. However, if it is not necessary to individually discriminate multiple elements with substantially the same functions and structures, only the same reference signs are attached. For example, in case of unnecessary to particularly discriminate base stations 10A, 10B, 10C and 10D, it is simply called as base station 10.

Firstly, the general configuration of the communication system 1 according to an embodiment of the present invention will be described with reference to FIG. 1.

Figure 1:
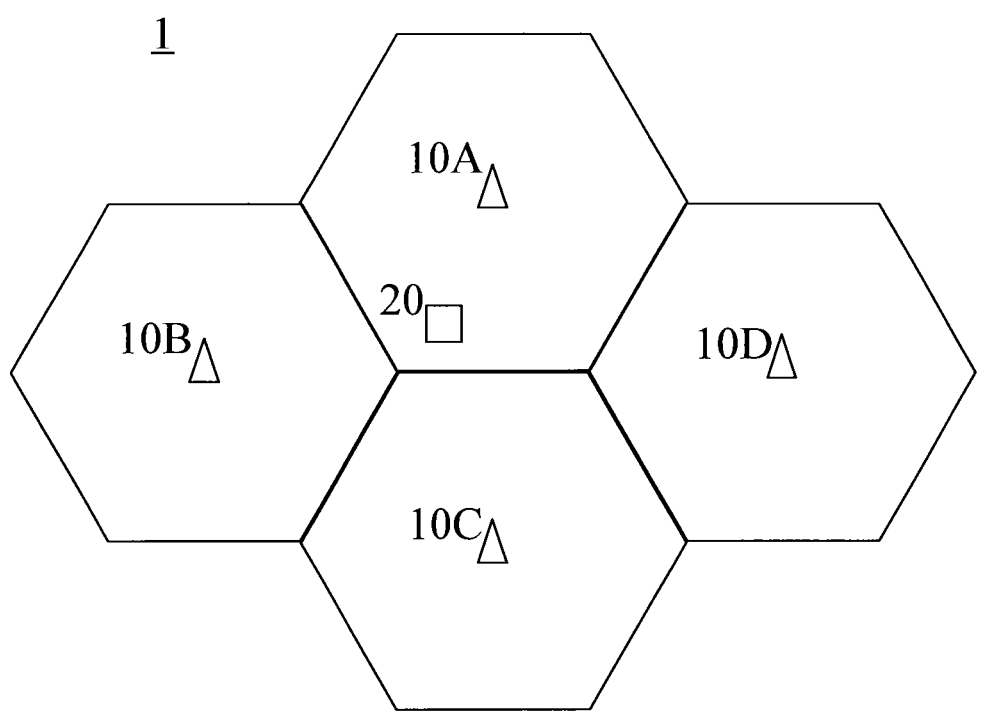
FIG. 1 is a schematic view for illustrating the configuration of a communication system 1 according to an embodiment of the present invention.

FIG. 1 is a schematic view for illustrating the configuration of the communication system 1 according to an embodiment of the present invention. As shown in FIG. 1, the communication system 1 according to an embodiment of the present invention includes multiple base stations 10 and a communication terminal 20.

The communication terminal 20 (user equipment) communicates with the base stations 10 under the control of the base stations 10. For example, the communication terminal 20 performs reception processing on the downlink resources allocated by the base stations 10 and performs transmission processing on the uplink resources.

The communication terminal 20 may be an information processing device such as personal computer (PC), home video processing device (DVD recorder, video cassette recorder, etc.), personal digital assistant (PDA), home game console or home appliance. Further, the communication terminal 20 may be a mobile communication device such as mobile phone, personal handy-phone system (PHS), portable music player, portable video processing device or portable game console.

The base stations 10 communicate with the communication terminal 20 located within its coverage. For example, the base station 10A may communicate with a communication terminal 20A located within the coverage of the base station 10A. In the present disclosure, the description will be made under the following assumptions. The base stations 10 are base stations for macro cells (eNodeB), but the base stations 10 is not limited to the base stations for macro cells. For example, the base stations 10 may be base stations for pico cells/micro cells with a maximal transmission power smaller than that of base stations for macro cells, or may be relaying nodes or base stations for femto cells.

Data communication may be performed between the base stations 10 to facilitate achieving coordinated multiple points transmission. In the coordinated base stations, the base station serving the communication terminal 20 is called as a main base station when the communication mode of coordinated multiple points transmission is ended and the conventional non-coordinated mode is used for communication. The coordinated base stations other than the main base station are called as other base stations. Respective operations in controlling the feedback of channel state information which will be described in the following may be performed in a main base station, may be performed in one of the other base stations, or may be performed by a main base station and one or several of the other base stations cooperatively.

Next, the structure of a base station 200 according to an embodiment of the present invention will be described in detail with reference to FIG. 2.

Figure 2:
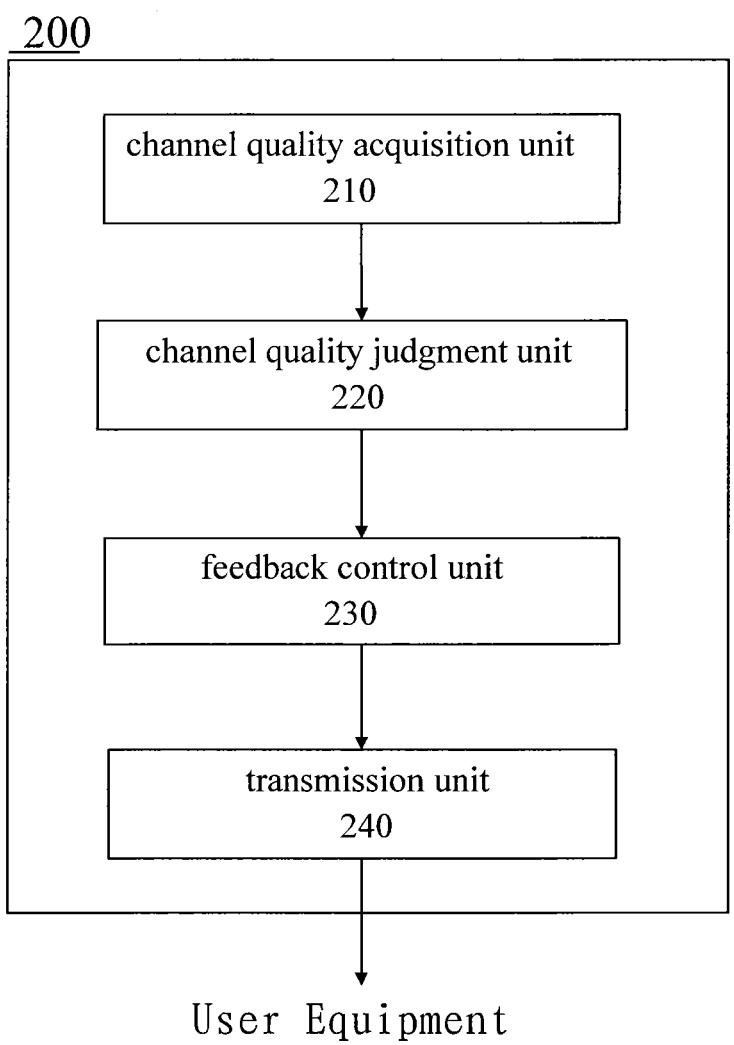
FIG. 2 is a block diagram for illustrating the functional structure of a base station according to an embodiment of the present invention.

FIG. 2 is a block diagram for illustrating the functional structure of the base station 200 according to an embodiment of the present invention. The base station 200 may be an example of the base stations 10 in the communication system 1 as shown in FIG. 1. As shown in FIG. 2, the base station 200 according to an embodiment of the present invention includes a channel quality acquisition unit 210, a channel quality judgment unit 220, a feedback control unit 230 and a transmission unit 240.

The channel quality acquisition unit 210 acquires the uplink channel qualities of uplink channels between the communication terminal 20 and coordinated base stations. The channel quality acquisition unit 210 may use various methods conventionally applied in the art to acquire the uplink channel qualities. For example, values of parameters which can indicate the uplink channel qualities are obtained according to communication signals (uplink channel signals) received from the communication terminal 20 over corresponding uplink channels. For example, the parameters which can indicate the uplink channel qualities are those such as uplink reception signal power, signal to interference plus noise ratio of uplink reception signal, and etc.

The channel quality judgment unit 220 judges whether the uplink channel qualities are good or bad by comparing the uplink channel qualities acquired by the channel quality acquisition unit 210 with a predetermined quality threshold Th1 (corresponding to "first quality threshold").

It is possible to design the quality threshold Th1 based on design requirements on the system. In an example, when a base station receives fed-back channel state information, the feedback is inefficient or non-effective if it is not possible to accurately demodulate the channel state information. In this case, it is not necessary to feed back channel state information to such a base station without good uplink channel quality. Therefore, the feed back may be set so that the demodulation result of the fed-back channel state information can meet the system requirement when the uplink channel quality is better than the channel quality represented by the quality threshold Th1; and the demodulation result of the fed-back channel state information fails to meet the system requirement when the uplink channel quality is worse than the channel quality represented by the quality threshold Th1. In specific, it is required to perform system tests in advance and determine, according to the test results, the value of the threshold Th1 which can fulfill the system demodulation performance requirement.

The feedback control unit 230 determines whether the communication terminal 20 is allowed to feed back the channel state information to corresponding coordinated base stations according to the judgment result provided by the channel quality judgment unit 220. The feedback control unit 230 determines that the communication terminal 20 is allowed to feed back the channel state information to the corresponding coordinated base stations when the judgment result indicates that the uplink channel qualities are better than the channel quality represented by the quality threshold Th1; The feedback control unit 230 determines that the communication terminal 20 is not allowed to feed back the channel state information to the corresponding coordinated base stations when the judgment result indicates that the uplink channel qualities are worse than the channel quality represented by the quality threshold Th1.

The transmission unit 240 transmits information indicating how to feed back the channel state information to the communication terminal 20. The communication terminal 20 feeds back the channel state information according to the information indicating how to feed back the channel state information received from the base station 10. The information indicating how to feed back the channel state information may include the determination result of the feedback control unit 230, specific feedback modes of the channel state information determined via other manners, and etc.

In the above embodiment, the base station 200 determines whether the communication terminal 20 is allowed to feed back the channel state information to corresponding base stations according to whether the uplink channel qualities of uplink channels between the communication terminal 20 and respective coordinated base stations are good or bad. By selecting base stations to which the feedback is allowed, the number of base station to which the channel state information is fed back is reduced, thereby indirectly reducing the number of the channel state information to be fed back, and reducing communication resources occupied by the feedback of the channel state information.

In third embodiment, however, there is no discrimination between the main base station and the other base stations of the coordinated base stations. In another embodiment, for example, in the communication system as shown in FIG. 1, the feedback control unit 230 may be configured to allow the communication terminal 20 to feed back the channel state information to the main base station (for example, the base station 10A) of the coordinated base stations 10 in a feedback mode according to non-coordinated multiple points transmission, regardless of the uplink channel quality of the uplink channel between the communication terminal 20 and the main base station. In other words, the feedback control unit 230 may be configured to always allow the feedback of the channel state information to the main base station 10A of the coordinated base stations 10, regardless of the uplink channel quality of the uplink channel between the communication terminal 20 and the main base station. This configuration facilitates the switching between multiple point coordination and non-multiple point coordination. For example, the communication terminal 20 is in a state where it is served in the multiple point coordination at a moment, and then the multiple point coordination service is no longer needed for some reason (for example, the communication terminal 20 is moving towards the main base station 10A). It is possible to switch to the state of non-multiple point coordination, and only feed back the channel state information of the main base station 10A. It can be seen that, regardless of the state of multiple point coordination or the state of non-multiple point coordination, the manner of feeding back relevant information to the main base station keeps unchanged, thus facilitating the switching between the multiple point coordination and the non-multiple point coordination.

Figure 3:
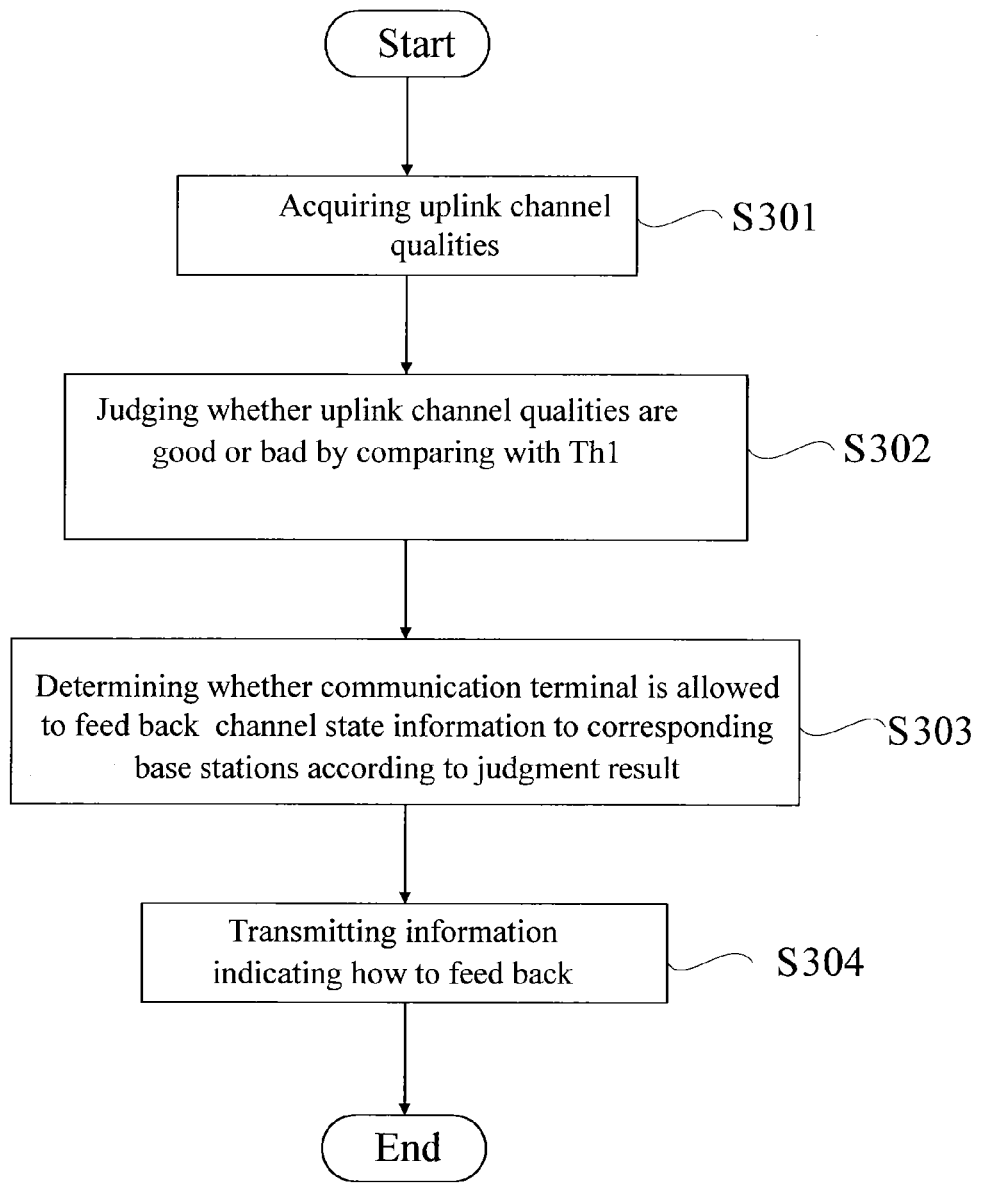
FIG. 3 is a flow chart for illustrating a method of controlling the channel state information feedback according to an embodiment of the present invention.

FIG. 3 is a flow chart for illustrating a method of controlling the channel state information feedback according to an embodiment of the present invention.

At step S301, uplink channel qualities of uplink channels between the communication terminal 20 and respective coordinated base stations are acquired. Various methods conventionally applied in the art may be used to acquire the uplink channel qualities. For example, values of parameters which can indicate the uplink channel qualities are acquired according to uplink channel signals received from the communication terminal 20.

At step S302, it is judged whether the uplink channel qualities are good or bad by comparing the acquired uplink channel qualities with a predetermined quality threshold Th1. It is possible to design the quality threshold Th1 based on design requirements on the system. For example, the feed back may be set so that the demodulation result of the fed-back channel state information can meet the system requirement when the uplink channel quality is better than the channel quality represented by the quality threshold Th1; and the demodulation result of the fed-back channel state information fails to meet the system requirement when the uplink channel quality is worse than the channel quality represented by the quality threshold Th1.

Then, at step S303, it is determined whether the communication terminal 20 is allowed to feed back the channel state information to corresponding coordinated base stations according to the judgment result of step S302. It is determined that the communication terminal 20 is allowed to feed back the channel state information to the corresponding coordinated base stations when it is judged at step S302 that the uplink channel qualities are better than the channel quality represented by the quality threshold Th1. It is determined that the communication terminal 20 is not allowed to feed back the channel state information to the corresponding coordinated base stations when it is judged at step S302 that the uplink channel qualities are worse than the channel quality represented by the quality threshold Th1.

At step S304, information indicating how to feed back the channel state information is transmitted to the communication terminal 20, so as to control the communication terminal 20 to feed back the channel state information to the corresponding coordinated base stations. The information indicating how according to feed back the channel state information may include the determination result of step S303, and specific feedback modes of the channel state information determined via other methods.

As described with respect to the functional structure of the base station 200 by referring to FIG. 2, it is also possible to consider discriminating the main base station and the other base stations of the coordinated base stations at the time of using the method as shown in FIG. 3 to control the feedback of the state information. That is to say, the judgment is only made with respect to the uplink channel qualities of the other base stations. With respect to the main base station, the channel state information is fed back in a mode of non-multiple point coordination regardless of its uplink channel quality.

Figure 4:
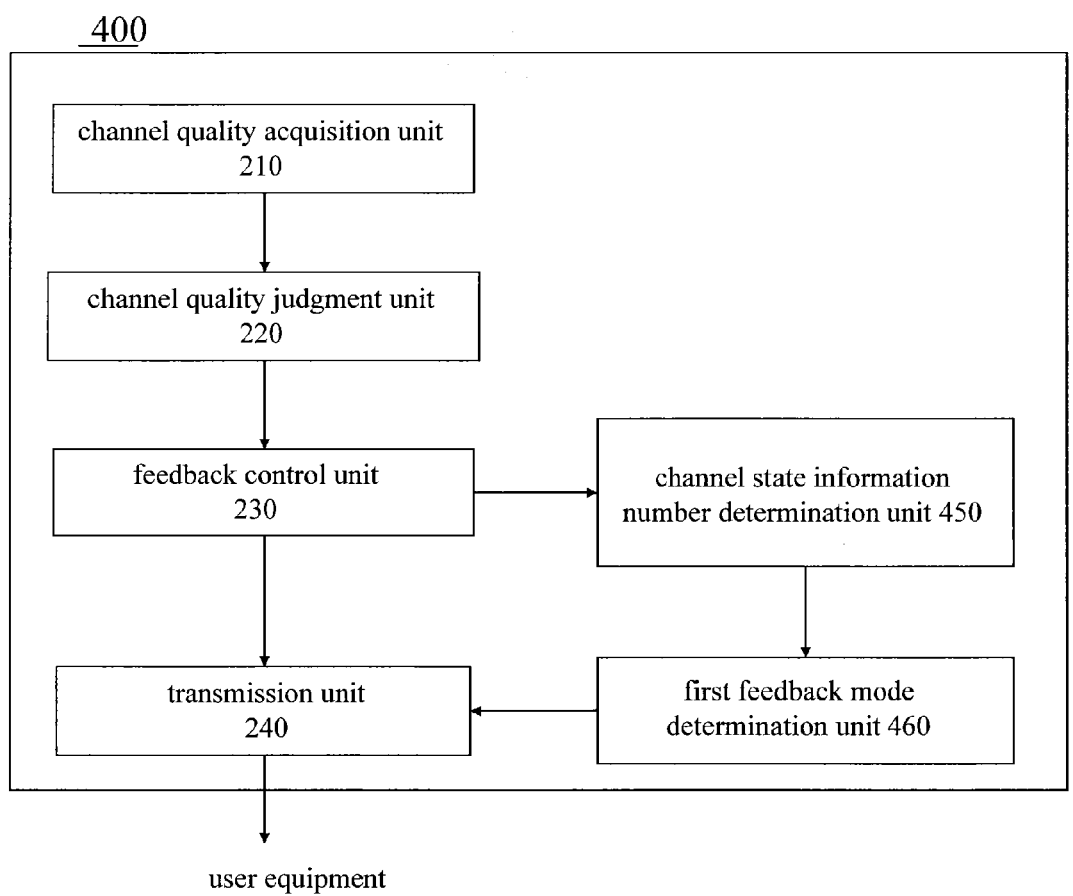
FIG. 4 is a block diagram for illustrating the functional structure of a base station according to another embodiment of the present invention.

Next, the functional structure of a base station 400 according to another embodiment of the present invention will be described with reference to FIG. 4. Similarly, the base station 400 may be regarded as a specific example of the base stations 10 in the communication system as shown in FIG. 1. FIG. 4 is a block diagram for illustrating the functional structure of the base station 400 according to another embodiment of the present invention.

As shown in FIG. 4, the base station 400 includes a channel quality acquisition unit 210, a channel quality judgment unit 220, a feedback control unit 230, a transmission unit 240, a channel state information number determination unit 450 and a first feedback mode determination unit 460. The channel quality acquisition unit 210, channel quality judgment unit 220, feedback control unit 230 and transmission unit 240 have the same structures and functions as the corresponding units described with reference to FIG. 2, and their detailed description is omitted here.

The channel state information number determination unit 450 may determine the number of the channel state information to be fed back based on a definition on the channel state information. The definition on the channel state information may be specified based on design requirements on the communication system. The meaning of determining the number of the channel state information to be fed back based on the definition on the channel state information will be illustrated in the following through an example.

In an example, it is assumed that, with respect to the base stations 10A, 10B, 10C and 10D for multiple point coordination in the communication system shown in FIG. 1, the feedback control unit 230 determines that the communication terminal 20 is allowed to feed back the channel state information to the main base station 10A and the base stations 10B and 10C, and is not allowed to feed back the channel state information to the base station 10D. Further, it is assumed that the communication terminal 20 respectively measures reception signal powers of the main base station 10A and the base station 10B, the base station 10C and the base station 10D as S1, S2, S3 and S4, and the reception noise power is N. For example, it is possible to define the channel state information to be fed back CSi in the following manner:

$$CS1 = \frac{S_1}{N + S_4},$$

$$CS2 = \frac{S_1 + S_2}{N + S_4},$$

$$CS3 = \frac{S_1 + S_3}{N + S_4},$$

$$CS4 = \frac{S_1 + S_2 + S_3}{N + S_4}$$

In this example, the channel state information is defined as the form of a signal to interference plus noise ratio. Of course, the channel state information is not limited this. The channel state information may also be any information capable of reflecting the channel state, comprising, but not limited to, at least one of signal to interference plus noise ratio of channels, a channel state matrix, the rank of the channel state matrix, multipath latencies, doppler frequency shifts, the rank of multi-input multi-output channels and beamforming vectors.

In this example, the channel state information is not fed back to the base station 10D because the uplink channel quality of the base station 10D is worse. That is to say, the base station 10D is not participating in the coordination of multiple point transmission at present. Therefore, the received signal of the base station 10D is regarded as an interference signal. The channel state information number determination unit 450 determines the number of the channel state information to be fed back as 4 based on the definition on the channel state information in this example.

The first feedback mode determination unit 460 may determine the feedback mode to be used by the communication terminal 20 according to the determined number of the channel state information to be fed back. Currently, there are various methods of selecting the feedback mode according to the number of the channel state information to be fed back. In an embodiment of the present invention, the first feedback mode determination unit 460 determines a simple feedback mode as the feedback mode of the channel state information to be used by the communication terminal 20 when the number of the channel state information to be fed back is less than or equal to a predetermined threshold M. The simple feedback mode is a time division multiplexing feedback mode or a non-time division multiplexing feedback mode. The non-time division multiplexing feedback mode includes those such as Frequency division multiplexing feedback mode, code division multiplex feedback mode and other non-time division multiplexing feedback modes. When the number of the channel state information to be fed back is greater than the predetermined threshold M, the first feedback mode determination unit 460 determines a feedback mode combining time division multiplexing and non-time division multiplexing as the feedback mode of the channel state information to be used by the communication terminal 20.

Parts (a) and (b) of FIG. 5 respectively and schematically illustrates examples of applying the feedback mode of non-time division multiplexing and the feedback mode combining time division multiplexing and non-time division multiplexing to channel state information CS1 to CS4 in the above example. In FIG. 5 (*a*), the channel state information CS1 to CS4 are fed back via the mode of non-time division multiplexing. In this case, although there is not any feedback latency, it is possible to cause significant reduction of the coverage of PUCCH or PUSCH, even cause reduction exceeding the extent acceptable to the system. In view of this, in an embodiment of the present invention, the threshold M may be set so that the coverage drop of PUCCH or PUSCH caused by the non-time division multiplexing feedback mode falls within the extent acceptable to the system when the number of the channel state information to be fed back is less than or equal to the predetermined threshold M, and the coverage drop of PUCCH or PUSCH caused by the non-time division multiplexing feedback mode exceeds the extent acceptable to the system when the number of the channel state information to be fed back is larger than the predetermined threshold M. According to this setting criterion, it is possible to determine the value of the threshold M by determining the tolerance of the system to the coverage drop of PUCCH or PUSCH through system tests in advance.

It is assumed that in the present example, the value of M is 3. Because the number of the channel state information to be fed back is 4, the first feedback mode determination unit 360 may determine to feed back the channel state information in a feedback mode combining time division multiplexing and non-time division multiplexing. The specific mode of feedback may be that as shown in FIG. 5 (*b*) for example. The combination of the channel state information CS1 and CS2, and the combination of the channel state information CS3 and CS4 are respectively fed back in the mode of non-time division multiplexing, and between these two combinations, the feedback is performed in the mode of time division multiplexing (it is a mode of 2:2 here). Of course, it is also possible to perform the feedback in a mode of 1:3. For example, it is possible to form the channel state information CS1 as one group, and form CS2 to CS4 as one group via non-time division multiplexing, and between the two groups, the feedback is performed via time division multiplexing (not shown).

In another embodiment, according to the system design, the first feedback mode determination unit 460 may also determine the feedback mode of time division multiplexing as the feedback mode to be used by the communication terminal 20 when the number of the channel state information to be fed back is less than or equal to the predetermined threshold M, and determine the feedback mode combining time division multiplexing and non-time division multiplexing as the feedback mode to be used by the communication terminal 20 when the number of the channel state information to be fed back is greater than the predetermined threshold M. In this embodiment, considering of the latency to be caused by the time division multiplexing feedback, it is possible to set the predetermined threshold M so that the latency caused by the time division multiplexing feedback mode falls within the extent acceptable to the system when the number of the channel state information to be fed back is less than or equal to the predetermined threshold M; the latency caused by the time division multiplexing feedback mode exceeds the extent acceptable to the system when the number of the channel state information to be fed back is greater than the predetermined threshold M.

After the determination by the first feedback mode determination unit 460, the transmitting unit 240 transmits information indicating how to feed back the channel state information to the communication terminal 20 (user equipment). The information indicating how to feed back the channel state information may include a determination result from the feedback control unit 230 regarding which base stations it is allowed to feed back the channel state information to, and the multiplexing feedback mode from the first feedback mode determination unit 460 which is determined according to the number of the channel state information to be fed back. Consequently, the communication terminal 20 can feed back the channel state information CS1 to CS4 to the base stations 10A to 10C by broadcasting according to received the control information.

It should be noted that the functions implemented by the channel state information number determination unit 450 and the first feedback mode determination unit 460 may be performed in the communication terminal 20. For example, the channel state information number determination unit configured in the communication terminal 20 may determine the number of the channel state information to be fed back based on the known definition on the channel state information. Then, the feedback mode determination unit configured in the communication terminal 20 may determine the feedback mode of the channel state information according to the determined number of the channel state information to be fed back. The feedback mode determination unit makes the wireless communication terminal 20 feed back the channel state information in the feedback mode of non-time division multiplexing when the number of the channel state information to be fed back is less than or equal to the predetermined threshold, and the feedback mode determination unit makes the wireless communication terminal 20 feed back the channel state information in the feedback mode combining time division multiplexing and non-time division multiplexing when the number of the channel state information to be fed back is greater than the predetermined threshold. Finally, the feed back unit feeds back the channel state information to the respective base stations according to the determination result of the feedback mode determination unit.

Even though the operation of selecting the feedback mode according to the number of the channel state information is performed in the user equipment, the criterion for determining the predetermined threshold may also be the same as that described in the above. It will be repeatedly described here.

Next, the functional structure of a base station 600 according to another embodiment of the present invention will be described with reference to FIG. 6. Similarly, the base station 600 may be regarded as a specific example of the base stations 10 in the communication system as shown in FIG. 1. FIG. 6 is a block diagram for illustrating the functional structure of the base station 600 according to another embodiment of the present invention.

As shown in FIG. 6, the base station 600 includes a channel quality acquisition unit 210, a channel quality judgment unit 220, a feedback control unit 230, a transmitting unit 240, a channel state information number determination unit 450, a first feedback mode determination unit 460, a priority setting unit 670 and a second feedback mode determination unit 680. The channel quality acquisition unit 210, channel quality judgment unit 220, feedback control unit 230 and transmitting unit 240 have the same structures and functions as the corresponding units described with reference to FIG. 2, the channel state information number determination unit 450 and first feedback mode determination unit 460 have the same structures and functions as the corresponding units described with reference to FIG. 4, and their detailed description is omitted here In the above example, the first feedback mode determination unit 460 determines that the communication terminal 20 has to feed back the channel state information CS1 to CS4 in the feedback mode combining time division multiplexing and non-time division multiplexing. As stated above, in case of the predetermined threshold M=3 for example, the feed back of CS1 to CS4, which combines the multiplexing, includes various combinations: for example, the non-time division multiplexing is applied to a combination of one pair of CS1 to CS4 and another combination of another pair of CS1 to CS4, and between the combinations, a 2:2 mode of time division multiplexing is used; and the non-time division multiplexing is applied to any three of CS1 to CS4, and a 1:3 mode of time division multiplexing is applied to the remained one. Further, each of the 2:2 mode and the 1:3 mode may include various possible combinations. In this case, it is possible to determine which of the combinations is used according to the system's needs, such as requirements on communication efficiency, and the influence of the combination on the coverage of PUCCH and PUSCH.

In the embodiment as shown in FIG. 6, it is intended to determine a specific mode of combining the multiplexing according to channel qualities of uplinks between the communication terminal 20 and coordinated base stations. In the base station 600 according to the present embodiment, when the first feedback mode determination unit 460 determines the feedback mode combining time division multiplexing and non-time division multiplexing as the feedback mode to be used by the communication terminal 20, the priority setting unit 670 sets a priority for the channel state information according to the definition on the channel state information and uplink channel quality of an uplink channel between the communication terminal 20 and each coordinated base station. For example, the priority setting unit 670 may set the priority by setting a higher priority for the channel state information which is more correlated with an uplink channel having a better channel quality.

Then the second feedback mode determination unit 680 determines a feedback multiplexing mode of the channel state information according to the priority set by the priority setting unit 670. For example, the second feedback mode determination unit 680 may determine the feedback multiplexing mode so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

This aspect will be illustrated via an example in the following. Like the example mentioned in the above, the communication terminal 20 will feed back the channel states CS1 to CS4, and the predetermined threshold M=3. The first feedback mode determination unit determines the feedback mode combining time division multiplexing and non-time division multiplexing as the feedback mode to be used by the communication terminal 20. In the case, the priority setting unit 670 sets a priority for CS1 to CS4 according to the definition on the channel state information (signal to interference plus noise ratio in the present example) and the uplink channel quality of an uplink channel between the communication terminal 20 and each coordinated base station.

Here, it is assumed that the uplink channel qualities of uplink channels between the communication terminal 20 and the coordinated base stations 10A to 10D are Q1 to Q4, and Q1 to Q4 are arranged in the descending order. In other words, the uplink channel quality of the base station 10A is better than the uplink channel quality of the base station 10B, the uplink channel quality of the base station 10B is better than the uplink channel quality of the base station 10C, and the uplink channel quality of the base station 10C is better than the uplink channel quality of the base station 10D. As described in the above, the uplink channel quality of the base station 10D is the lowest, and therefore cannot meet the system requirement on the demodulation performance of uplink information. Therefore, the channel state information is not fed back to the base station 10D, and its reception signal power S4 is regarded as the interference signal power.

From the definitions on CS1 to CS4

$$CS1 = \frac{S_1}{N + S_4},$$

$$CS2 = \frac{S_1 + S_2}{N + S_4},$$

$$CS3 = \frac{S_1 + S_3}{N + S_4},$$

$$CS4 = \frac{S_1 + S_2 + S_3}{N + S_4},$$

it is known that CS1 has the maximal correlation with the uplink channel of the base station 10A. In fact, in case that the interference and the noise do not change, CS1 is correlated with only the reception power S1 of the base station 10A as compared with CS2 to CS4. Therefore, the priority setting unit 670 sets the priority of CS1 as the highest priority. Likewise, CS2 is most correlated with the uplink channel of the base station 10B as compared with CS3 and CS4. Therefore, the priority setting unit 670 sets the priority of CS2 as the secondly highest priority. CS3 is more correlated with the uplink channel of the base station 10C as compared with CS4. Therefore, the priority setting unit 670 sets the priority of CS3 as the thirdly highest priority. CS4 has weak correlation with the respective base stations. Therefore, the priority setting unit 670 sets the priority of CS4 as the lowest priority.

Then, in the present embodiment, the second feedback mode determination unit 680 determines the feedback multiplexing mode of the channel state information according to the priority set by the priority setting unit 670. For example, with respect to CS1 to CS4, because CS1 has the highest priority and the threshold M=3, that is, the system can support the case of non-time division multiplexing of up to three channel state information, the second feedback mode determination unit 680 may determine the feedback multiplexing mode such that CS1 is fed back in the mode of time division multiplexing, and CS2 to CS4 are fed back in the mode of non-time division multiplexing. Of course, it is also possible to apply a 2:2 mode where one pair of CS1 to CS4 forms a combination and another pair forms another combination. In the case, the second feedback mode determination unit 680 can determine any combined mode for feedback.

In another example, there may be 5 channel state information CS1 to CS5, their priorities are arranged in the descending order, and the predetermined threshold M=3. In the case, the second feedback mode determination unit 680 may determine the feedback multiplexing mode such that the non-time division multiplexing feedback is applied by taking channel state information CS1 and CS2 having higher priorities as a group, and the non-time division multiplexing feedback is applied by taking channel state information CS3 and CS5 having lower priorities as a group.

In an embodiment, the second feedback mode determination unit 680 may determine the feedback multiplexing mode of the channel state information by selecting a predetermined number of the channel state information with the lowest priority to feed back via non-time division multiplexing, and the rest of the channel state information to feed back via time division multiplexing or non-time division multiplexing. Here, the predetermined number may be set so that the coverage drop of PUCCH or PUSCH caused by the channel state information feedback via non-time division multiplexing falls within the extent acceptable to the system when the number of the channel state information to be fed back is less than or equal to the predetermined number, and the coverage drop of PUCCH or PUSCH caused by the channel state information feedback via non-time division multiplexing exceeds the extent acceptable to the system when the number of the channel state information to be fed back is larger than the predetermined number.

For example, with respect to the example of channel state information CS1 to CS4 and the predetermined threshold M=3, the second feedback mode determination unit 680 may determine the multiplexing feedback mode of CS1 to CS4 by selecting a predetermined number (i.e., 3) of channel state information (i.e., CS2 to CS4) with the lowest priority to feed back via non-time division multiplexing, and the rest of the channel state information (i.e., CS1) to feed back via time division multiplexing.

With respect to the example of channel state information CS1 to CS5 and the predetermined threshold M=3, the second feedback mode determination unit 680 may determine the multiplexing feedback mode of CS1 to CS5 by selecting a predetermined number (i.e., 3) of channel state information (i.e., CS3 to CS5) with the lowest priority to feed back via non-time division multiplexing, and the rest of the channel state information (i.e., CS1 and CS2) to feed back via non-time division multiplexing.

Here, it should be noted that the configuration and implementation of the priority setting unit 670 and second feedback mode determination unit 680 are not necessary to be based on that of other units in the embodiment as shown in FIG. 6. In fact, it is possible to independently configure the priority setting unit and second feedback mode determination unit to achieve their functions. The following description will be made with reference to FIG. 7.

FIG. 7 is a block diagram for illustrating the functional structure of a base station 700 according to an embodiment of the present invention. The base station 700 may be regarded as an example of the base stations 10 in the communication system as shown in FIG. 1. As shown in FIG. 7, the base station 700 includes a channel quality acquisition unit 710, a priority setting unit 720, a feedback mode determination unit 730 and a transmission unit 740.

The channel quality acquisition unit 710 acquires the uplink channel qualities of uplink channels between the communication terminal 20 and coordinated base stations. The priority setting unit 720 sets a priority for the channel state information according to the definition on the channel state information and the uplink channel quality of an uplink channel between the communication terminal 20 and each coordinated base station. The priority setting unit 720 may set the priority by setting a higher priority for the channel state information which is more correlated with an uplink channel having a better channel quality. When the channel state information is to be fed back by the communication terminal 20 in the feedback mode combining time division multiplexing and non-time division multiplexing, the feedback mode determination unit 730 determines the feedback multiplexing mode for the channel state information according to the priority set by the priority setting unit 720 and provides the determination result to the transmission unit 740. The transmission unit 740 transmits the information indicating the determined feedback multiplexing mode to the communication terminal 20.

The feedback mode determination unit 730 may determine the feedback multiplexing mode so that the priority of the channel state information fed back via time division multiplexing is higher than the priority of the channel state information fed back via non-time division multiplexing, and in case of using non-time division multiplexing, the priority of a smaller number of the channel state information via non-time division multiplexing and sharing an identical time period is higher than the priority of a larger number of the channel state information via non-time division multiplexing and sharing another identical time period.

In an embodiment, the feedback mode determination unit 730 may determine the feedback multiplexing mode by selecting a predetermined number of the channel state information with the lowest priority to feed back via non-time division multiplexing, and the rest of the channel state information to feed back via time division multiplexing or non-time division multiplexing. Here, the "predetermined number" may be set so that the coverage drop of PUCCH or PUSCH caused by the channel state information feedback via non-time division multiplexing falls within the extent acceptable to the system when the number of the channel state information to be fed back is less than or equal to the predetermined number, and the coverage drop of PUCCH or PUSCH caused by the channel state information feedback via non-time division multiplexing exceeds the extent acceptable to the system when the number of the channel state information to be fed back is larger than the predetermined number.

Specific examples of implementation may be found in the examples used in the description of the embodiment of FIG. 6, and will not be described in detail here.

FIG. 8 is a flow chart for illustrating a method of determined the feedback multiplexing mode of channel state information according to an embodiment of the present invention.

As shown in FIG. 8, at step S801, uplink channel qualities of uplink channels between a communication terminal and coordinated base stations are acquired.

At step S802, a priority is set for the channel state information according to the definition on the channel state information and the uplink channel quality of an uplink channel between the communication terminal and each coordinated base station. For example, the priority may be set by setting a higher priority for the channel state information which is more correlated with an uplink channel having a better channel quality.

At step S803, the feedback multiplexing mode of the channel state information is determined according to the set priority when the channel state information is to be fed back by the communication terminal in a feedback mode combining time division multiplexing and non-time division multiplexing. For example, it is possible to determine the feedback multiplexing mode so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

At step S804, the information indicating the determined feedback multiplexing mode is transmitted to the communication terminal.

Further, it should be noted that the above function of setting a priority for the channel state information and determining a specific feedback multiplexing mode according to the priority may also be performed at the user equipment side. The following description will be made with reference to FIG. 9.

FIG. 9 is a block diagram for schematically illustrating the functional structure of a communication terminal 900 according to an embodiment of the present invention. The communication terminal 900 may be regarded as an example of the communication terminal 20 in the communication system as shown in FIG. 1. As shown in FIG. 9, the communication terminal 900 includes a channel quality acquisition unit 910, a priority setting unit 920, a feedback mode determination unit 930 and a feed back unit 940.

The channel quality acquisition unit 910 acquires the uplink channel quality of an uplink channel between the communication terminal and each coordinated base station. For example, the channel quality acquisition unit 910 may receive information indicating the uplink channel quality of an uplink channel between the communication terminal and each coordinated base station from a base station.

The priority setting unit 920 sets a priority for the channel state information according to the definition on the channel state information and the uplink channel quality of an uplink channel between the communication terminal 20 and each coordinated base station. The communication terminal 900 may receive information indicating the definition on the channel state information from the base station. The priority setting unit 920 may set the priority by setting a higher priority for the channel state information which is more correlated with an uplink channel having a better channel quality.

The feedback mode determination unit 930 may determine the feedback multiplexing mode of the channel state information according to the set priority when the channel state information is to be fed back by the wireless communication terminal in a feedback mode combining time division multiplexing and non-time division multiplexing. For example, the feedback mode determination unit 930 may determine the feedback multiplexing mode so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

Finally, the feed back unit 940 feeds back the channel state information according to the determination result of the feedback mode determination unit 930.

Further, returning to the respective embodiments described in connection with FIG. 2 to FIG. 6, the feedback control unit 230 performs control on which of the base stations the channel state information is allowed to be fed back to without discriminating between periodic feedback and non-periodic feedback in the coordinated multiple points transmission. In an additional embodiment, it is possible to discriminate between the periodic feedback and the non-periodic feedback, so as to perform the control described in the embodiment as shown in FIG. 2 to FIG. 6 on the non-periodic feedback. Likely, it is also possible to reduce the number of the channel state information to be fed back to some extent.

Preferable embodiments of the present invention are described in detail with reference to the accompanying drawings in the above, but the technical scope of the present disclosure is not limited to the above examples. One skilled in the art can obtain various alternatives and modifications within the scope of the appended claims, and it should be noted that the various alternatives and modifications of course fall within the technical scope of the present disclosure.

For example, it is not necessary to execute the processing steps of the base stations or the communication terminal of the present disclosure in the time sequence described in the flow charts. For example, it is possible to execute the processing steps of the base stations or the communication terminal in the present disclosure in a sequence different from the sequence described in the flow charts, or in parallel.

Further, it is possible to create a computer program which makes hardware mounted in the base stations or the communication terminal (such as central processing unit (CPU), read-only memory (ROM) and randomly accessing memory (RAM)) perform functions equivalent to the components of the base stations or the communication terminal. Further, there is also provided a storage medium for storing the computer program.

What is claimed is:

1. A base station for coordinated multiple points transmission, the base station comprising:
   circuitry including a memory storing instructions coupled to a central processing unit, the circuitry configured to:
   acquire uplink channel qualities of uplink channels between a user equipment and coordinated base stations;
   judge whether the uplink channel qualities are good or bad by comparing the acquired uplink channel qualities with a first quality threshold;
   determine whether the user equipment is allowed to feed back channel state information to corresponding coordinated base stations based on the judgment result;
   transmit information indicating how to feed back the channel state information to the user equipment;
   determine a number of the channel state information to be fed back based on a definition on the channel state information;
   determine a feedback mode to be used by the user equipment based on the determined number of the channel state information to be fed back,
   determine a feedback mode combining time division multiplexing and non-time division multiplexing as the feedback mode to be used by the user equipment when the number of the channel state information to be fed back is larger than a predetermined threshold; and,
   determine a feedback mode using a single one of time division multiplexing and non-time division multiplexing as the feedback mode to be used by the user equipment when the number of the channel state information to be fed back is less than or equal to the predetermined threshold,
   wherein the circuitry determines that the user equipment is allowed to feed back the channel state information to the corresponding coordinated base stations when the judgment result indicates that the uplink channel qualities are better than a channel quality represented by the first quality threshold; and the circuitry determines that the user equipment is not allowed to feed back at all the channel state information to the corresponding coordinated base stations when the judgment result indicates that the uplink channel qualities are worse than the channel quality represented by the first quality threshold.

2. The base station according to claim 1, wherein the first quality threshold is set so that a demodulation result of the fed-back channel state information meets a system requirement when the uplink channel quality is better than the channel quality represented by the first quality threshold, and the demodulation result of the fed-back channel state information fails to meet the system requirement when the uplink channel quality is worse than the channel quality represented by the first quality threshold.

3. The base station according to claim 1, wherein the circuitry is further configured to allow the user equipment to feed back the channel state information to a main base station among the coordinated base stations in a feedback mode according to non-coordinated multiple points transmission, regardless of the uplink channel quality of an uplink channel between the user equipment and the main base station.

4. The base station according to claim 1, wherein the circuitry is further configured to determine a non-time division multiplexing feedback mode as the feedback mode to be used by the user equipment when the number of the channel state information to be fed back is less than or equal to the predetermined threshold, and wherein the predetermined threshold is set so that a coverage drop of a physical uplink control channel or a physical uplink shared channel caused by the non-time division multiplexing feedback mode falls within an extent acceptable to a system when the number of the channel state information to be fed back is less than or equal to the predetermined threshold, and the coverage drop of the physical uplink control channel or the physical uplink shared channel caused by the non-time division multiplexing feedback mode exceeds the extent acceptable to the system when the number of the channel state information to be fed back is larger than the predetermined threshold.

5. The base station according to claim 1, wherein the circuitry is further configured to determine a time division multiplexing feedback mode as the feedback mode to be used by the user equipment when the number of the channel state information to be fed back is less than or equal to the predetermined threshold, and wherein the predetermined threshold is set so that a latency caused by the time division multiplexing feedback mode falls within an extent acceptable to a system when the number of the channel state information to be fed back is less than or equal to the predetermined threshold, and the latency caused by the time division multiplexing feedback mode exceeds the extent acceptable to the system when the number of the channel state information to be fed back is larger than the predetermined threshold.

6. The base station according to claim 1, wherein the circuitry is further configured to:
   set a priority for the channel state information according to the definition on the channel state information and the uplink channel quality of the uplink channel between the user equipment and each coordinated base station when the circuitry determines the feedback mode combining time division multiplexing and non-time division multiplexing as the feedback mode to be used by the user equipment; and
   determine a feedback multiplexing mode for the channel state information according to the set priority,
   wherein the circuitry sets the priority by setting a higher priority for the channel state information which is more correlated with the uplink channel having a better channel quality; and
   the circuitry determines the feedback multiplexing mode so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

7. The base station according to claim 6, wherein the circuitry is further configured to determine the feedback multiplexing mode by selecting a predetermined number of the channel state information with the lowest priority to feed back via non-time division multiplexing, and the rest of the channel state information to feed back via time division multiplexing or non-time division multiplexing; and wherein the predetermined number is set so that a coverage drop of a physical uplink control channel or a physical uplink shared channel caused by the non-time division multiplexing feedback mode falls within an extent acceptable to a system when the number of the channel state information to be fed back is less than or equal to the predetermined number, and the coverage drop of the physical uplink control channel or the physical uplink shared channel caused by the non-time division multiplexing feedback mode exceeds the extent acceptable to the system when the number of the channel state information to be fed back is larger than the predetermined number.

8. The base station according to claim 1, wherein the circuitry is further configured to only determine whether the user equipment is allowed to perform a non-periodic feedback of the channel state information to the corresponding coordinated base stations.

9. The base station according to claim 1, wherein the channel state information is information capable of reflecting the channel state, the channel state information comprising at least one of signal to interference plus noise ratio of channels, a channel state matrix, a rank of the channel state matrix, multipath latencies, doppler frequency shifts, a rank of multi-input multi-output channels and beamforming vectors.

10. A wireless communication method for coordinated multiple points transmission, the wireless communication method comprising:
  acquiring uplink channel qualities of uplink channels between a user equipment and coordinated base stations;
  judging whether the uplink channel qualities are good or bad by comparing the acquired uplink channel qualities with a first quality threshold;
  determining whether the user equipment is allowed to feed back channel state information to corresponding coordinated base stations based on the judgment result; and
  transmitting information indicating how to feed back the channel state information to the user equipment,
  determining a number of the channel state information to be fed back based on a definition on the channel state information;
  determining a feedback mode to be used by the user equipment based on the determined number of the channel state information to be fed back;
  determining a feedback mode combining time division multiplexing and non-time division multiplexing as the feedback mode to be used by the user equipment when the number of the channel state information to be fed back is larger than a predetermined threshold; and
  determining a feedback mode using a single one of time division multiplexing and non-time division multiplexing as the feedback mode to be used by the user equipment when the number of the channel state information to be fed back is less than or equal to the predetermined threshold,
  wherein the user equipment is allowed to feed back the channel state information to the corresponding coordinated base stations when the judgment result indicates that the uplink channel qualities are better than a channel quality represented by the first quality threshold; and that the user equipment is not allowed to feed back at all the channel state information to the corresponding coordinated base stations when the judgment result indicates that the uplink channel qualities are worse than the channel quality represented by the first quality threshold.

11. A base station for coordinated multiple points transmission, the base station comprising:
  circuitry including a memory storing instructions coupled to a central processing unit, the circuitry configured to:
  acquire uplink channel qualities of uplink channels between a user equipment and coordinated base stations;
  set a priority for channel state information according to a definition on the channel state information and the uplink channel quality of the uplink channel between the user equipment and each coordinated base station; and
  determine a feedback multiplexing mode of the channel state information according to the set priority when the channel state information is to be fed back by the user equipment in a feedback mode combining time division multiplexing and non-time division multiplexing; and
  transmit information indicating the determined feedback multiplexing mode to the user equipment,
  wherein the circuitry sets the priority by setting a higher priority for the channel state information which is more correlated with the uplink channel having a better channel quality; and
  the circuitry determines the feedback multiplexing mode so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

12. The base station according to claim 11, wherein the circuitry is further configured to determine the feedback multiplexing mode by selecting a predetermined number of the channel state information with the lowest priority to feed back via non-time division multiplexing, and the rest of the channel state information to feed back via time division multiplexing or non-time division multiplexing, wherein
  the predetermined number is set so that a coverage drop of a physical uplink control channel or a physical uplink shared channel caused by the channel state information feedback via non-time division multiplexing falls within an extent acceptable to a system when the number of the channel state information to be fed back is less than or equal to the predetermined number, and the coverage drop of the physical uplink control channel or the physical uplink shared channel caused by the channel state information feedback via non-time division multiplexing exceeds the extent acceptable to the system when the number of the channel state information to be fed back is larger than the predetermined number.

13. A wireless communication method for coordinated multiple points transmission, the wireless communication method comprising:
acquiring uplink channel qualities of uplink channels between a user equipment and coordinated base stations;
setting a priority for channel state information according to a definition on the channel state information and the uplink channel quality of the uplink channel between the user equipment and each coordinated base station; and
determining a feedback multiplexing mode of the channel state information according to the set priority when the channel state information is to be fed back by the user equipment in a feedback mode combining time division multiplexing and non-time division multiplexing; and
transmitting information indicating the determined feedback multiplexing mode to the user equipment,
wherein the priority is set by setting a higher priority for the channel state information which is more correlated with the uplink channel having a better channel quality; and
the feedback multiplexing mode is determined so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

14. A wireless communication terminal for coordinated multiple points transmission, the wireless communication terminal comprising:
circuitry including a memory storing instructions coupled to a central processing unit, the circuitry configured to:
acquire an uplink channel quality of an uplink channel between a user equipment and each coordinated base station;
set a priority for channel state information according to a definition on the channel state information and the uplink channel quality of the uplink channel between the wireless communication terminal and each coordinated base station; and
determine a feedback multiplexing mode of the channel state information according to the set priority when the channel state information is to be fed back by the wireless communication terminal in a feedback mode combining time division multiplexing and non-time division multiplexing; and
feed back the channel state information according to the determined feedback multiplexing mode,
wherein the circuitry sets the priority by setting a higher priority for the channel state information which is more correlated With the uplink channel having a better channel quality; and
the circuitry determines the feedback multiplexing mode so that the priority of the channel state information fed back via time division multiplexing is higher than the priority of the channel state information fed back via non-time division multiplexing, and among the channel state information fed back via non-time division multiplexing, the priority of a smaller number of the channel state information via non-time division multiplexing and sharing an identical time period is higher than the priority of a larger number of the channel state information via non-time division multiplexing and sharing another identical time period.

15. A wireless communication terminal for coordinated multiple points transmission, the wireless communication terminal comprising:
circuitry including a memory storing instructions coupled to a central processing unit, the circuitry configured to:
determine a number of channel state information to be fed back based on a definition on the channel state information;
determine a feedback mode of the channel state information based on the determined number of the channel state information to be fed back; and
feed back the channel state information according to the determined feedback mode, wherein
the circuitry determines the feedback mode combining time division multiplexing and non-time division multiplexing as the feedback mode of the channel state information when the number of the channel state information to be fed back is larger than a predetermined threshold; and
the circuitry determines a feedback mode using a single one of time division multiplexing and non-time division multiplexing as the feedback mode of the channel state information when the number of the channel state information to be fed back is less than or equal to the predetermined threshold.

16. The wireless communication terminal according to claim 15, wherein the circuitry is further configured to determine a non-time division multiplexing feedback mode as the feedback mode of the channel state information when the number of the channel state information to be fed back is less than or equal to the predetermined threshold, and wherein the predetermined threshold is set so that a coverage drop of a physical uplink control channel or a physical uplink shared channel caused by the non-time division multiplexing feedback mode falls within an extent acceptable to a system when the number of the channel state information to be fed back is less than or equal to the predetermined threshold, and the coverage drop of the physical uplink control channel or the physical uplink shared channel caused by the non-time division multiplexing feedback mode exceeds the extent acceptable to the system when the number of the channel state information to be fed back is larger than the predetermined threshold.

17. The wireless communication terminal according to claim 15, wherein the circuitry is further configured to determine a time division multiplexing feedback mode as the feedback mode of the channel state information when the number of the channel state information to be fed back is less than or equal to the predetermined threshold, and wherein the predetermined threshold is set so that a latency caused by the time division multiplexing feedback mode falls within an extent acceptable to a system when the number of the channel state information to be fed back is less than or equal to the predetermined threshold, and the latency caused by the time division multiplexing feedback mode exceeds the extent acceptable to the system when the number of the channel state information to be fed back is larger than the predetermined threshold.

* * * * *